(12) United States Patent
Wycech

(10) Patent No.: US 6,482,496 B1
(45) Date of Patent: *Nov. 19, 2002

(54) FOIL BACKED LAMINATE REINFORCEMENT

(75) Inventor: Joseph S Wycech, Grosse Pointe Woods, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/099,025

(22) Filed: Jun. 17, 1998

Related U.S. Application Data

(63) Continuation-in-part of application No. 08/675,173, filed on Jul. 3, 1996, now Pat. No. 5,888,600.

(51) Int. Cl.$^7$ .............................. B32B 3/00; B32B 3/28; B32B 27/40; E04C 2/32; B60J 5/00
(52) U.S. Cl. ..................... 428/71; 428/185; 428/425.8; 52/783.12; 296/146.6
(58) Field of Search ............................... 428/71, 319.1, 428/423.1, 425.8, 174, 182, 184, 185; 52/783.1, 783.11, 783.12; 296/146.1, 151, 146.5, 146.6

(56) References Cited

U.S. PATENT DOCUMENTS

| | | | |
|---|---|---|---|
| 3,123,170 A | 3/1964 | Bryant | 180/68 |
| 3,493,257 A | 2/1970 | Fitzgerald et al. | 293/71 |
| 3,665,968 A | 5/1972 | DePutter | 138/141 |
| 3,868,796 A | 3/1975 | Bush | 52/618 |
| 3,892,819 A | 7/1975 | Najvar | 260/836 |
| 3,919,443 A | 11/1975 | Porter | 428/81 |
| 4,019,301 A | 4/1977 | Fox | 52/725 |
| 4,042,746 A | 8/1977 | Hofer | 428/311 |
| 4,073,998 A | 2/1978 | O'Connor | 428/310 |
| 4,082,825 A | 4/1978 | Puterbaugh | 264/46.5 |
| 4,238,540 A | 12/1980 | Yates et al. | 428/36 |
| 4,399,174 A | 8/1983 | Tanaka et al. | 428/67 |
| 4,569,888 A * | 2/1986 | Muller et al. | 428/481 |
| 4,598,106 A | 7/1986 | Utsugi | 523/218 |
| 4,737,407 A | 4/1988 | Wycech | 428/323 |
| 4,751,249 A | 6/1988 | Wycech | 521/54 |
| 4,765,352 A | 8/1988 | Enomoto | 293/120 |
| 4,769,391 A | 9/1988 | Wycech | 521/54 |
| 4,836,516 A | 6/1989 | Wycech | 267/279 |
| 4,853,270 A | 8/1989 | Wycech | 428/68 |
| 4,861,097 A | 8/1989 | Wycech | 296/188 |
| 4,901,500 A * | 2/1990 | Wycech | 52/793 |
| 4,908,930 A | 3/1990 | Wycech | 29/527.2 |
| 4,922,596 A | 5/1990 | Wycech | 29/897.2 |
| 4,923,902 A | 5/1990 | Wycech | 521/54 |
| 4,978,562 A | 12/1990 | Wycech | 428/35.8 |
| 4,995,545 A | 2/1991 | Wycech | 228/119 |
| 5,019,605 A | 5/1991 | Jannic | 523/219 |
| 5,073,429 A | 12/1991 | Steinke et al. | 428/71 |

(List continued on next page.)

FOREIGN PATENT DOCUMENTS

| | | |
|---|---|---|
| DE | 2414114 | 10/1974 |
| DE | 3425778 | 1/1986 |
| DE | 3520479 | 10/1986 |
| EP | 0383498 | 8/1990 |
| GB | 2067478 | 7/1981 |
| WO | WO9014944 | 12/1990 |
| WO | WO9305103 | 3/1993 |
| WO | WO9802689 | 1/1998 |

*Primary Examiner*—Harold Pyon
*Assistant Examiner*—Michael C. Miggins
(74) *Attorney, Agent, or Firm*—Connolly Bove Lodge & Hutz LLP

(57) ABSTRACT

A reinforced wall comprises a stiff substrate having a reinforcing laminate bonded to its inner surface. The reinforcing laminate includes an outer foil support and an expandable polymer foam material bonded to the foil support or backing. The polymer foam is disposed against the inner surface of the substrate and becomes intimately bonded to the inner surface upon activation and expansion of the foam material.

29 Claims, 2 Drawing Sheets

OTHER PUBLICATIONS

| | | | |
|---|---|---|---|
| 5,124,186 A | 6/1992 | Wycech | 428/35.8 |
| 5,198,286 A * | 3/1993 | Kagoshima et al. | 428/246 |
| 5,213,391 A | 5/1993 | Takagi | 296/205 |
| 5,215,796 A | 6/1993 | Mueller et al. | 428/36.5 |
| 5,252,632 A | 10/1993 | Savin | 523/137 |
| 5,344,208 A | 9/1994 | Bien | |
| 5,345,720 A * | 9/1994 | Illbruck et al. | 49/502 |
| 5,453,453 A | 9/1995 | Lamon et al. | 521/54 |
| 5,575,526 A | 11/1996 | Wycech | 296/205 |
| 5,665,461 A | 9/1997 | Wong et al. | 523/218 |
| 5,695,867 A | 12/1997 | Saitoh et al. | 428/219 |
| 5,755,486 A * | 5/1998 | Wycech | 296/188 |
| 5,888,600 A * | 3/1999 | Wycech | 428/35.9 |
| RE36,323 E * | 10/1999 | Thompson et al. | 181/286 |

* cited by examiner

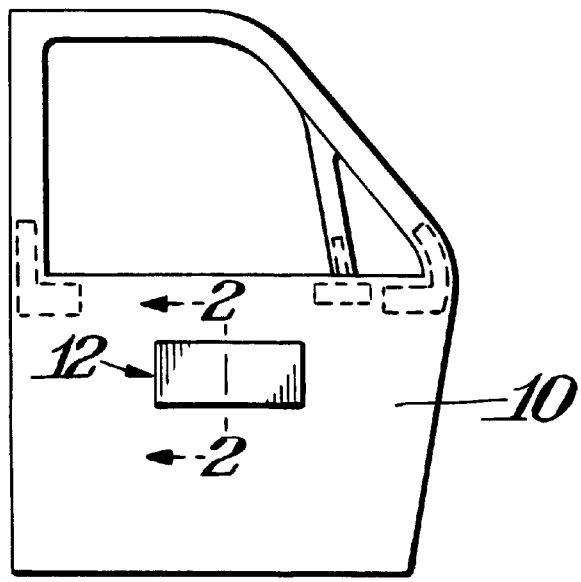
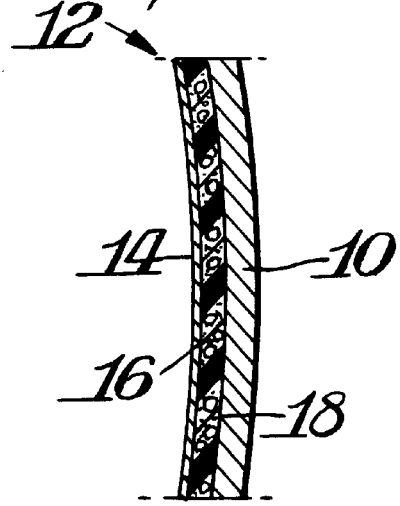
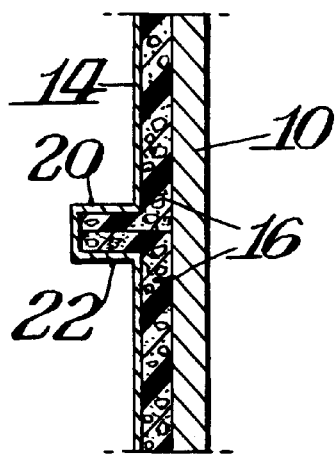
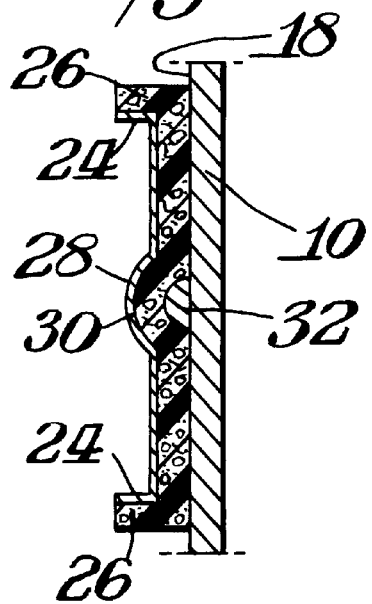

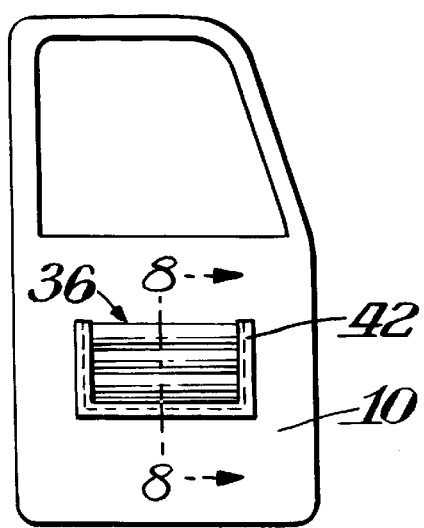
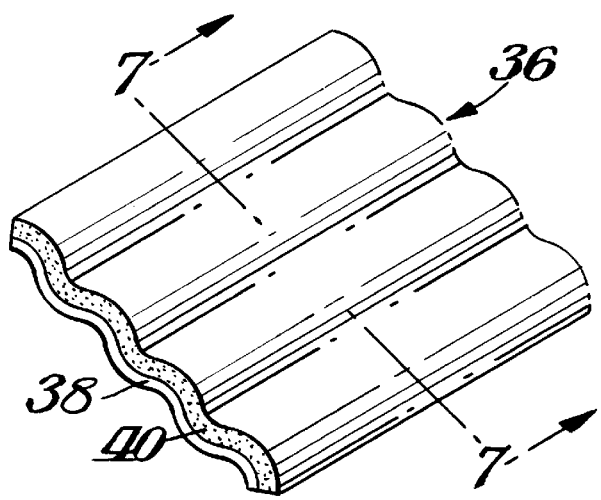
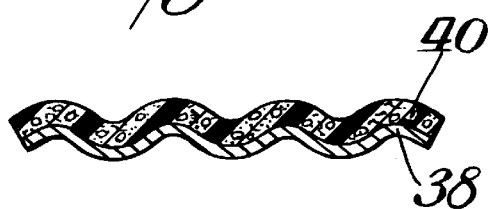
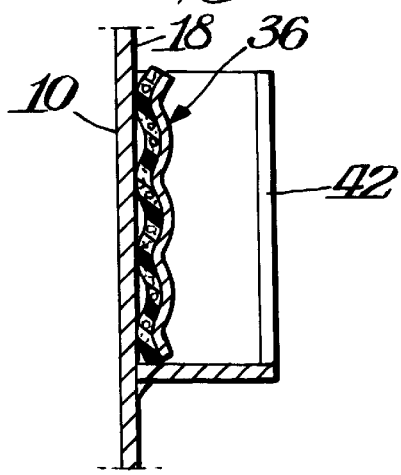
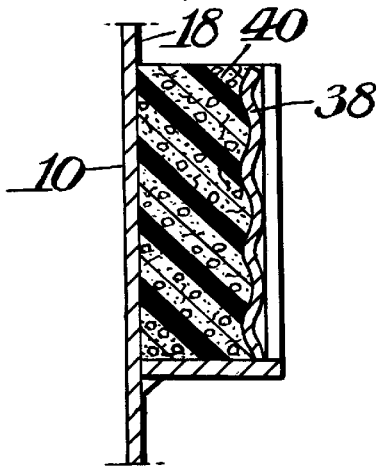

FOIL BACKED LAMINATE REINFORCEMENT

CROSS-REFERENCE TO RELATED APPLICATION

The present application is a continuation in part of co-pending application Ser. No. 08/675,173 filed Jul. 3, 1996, Now U.S. Pat. No. 5,888,660.

BACKGROUND OF THE INVENTION

In a number of applications, light-weight, high strength structural members are required. For example, in motor vehicles and aircraft as well as in various devices, such as home appliances and the like a number of composite materials have been proposed in the past as structural members, such as exotic light-weight alloys. In most applications, however, mass reduction must be balanced against the cost of the product to the consumer. Thus, there is a need for providing strength without significantly increasing material and labor costs. Moreover, reinforcement techniques are needed which can be adapted to existing geometries of structural parts obviating any requirement for fundamental design changes.

It would be desirable to provide a structural member which may be generally considered as a wall with some form of reinforcement. While such forms of reinforcement could have numerous applications, it would be particularly desirable to provide such reinforcements for door panels of vehicles.

A typical motor vehicle door includes an outer skin or panel of thin steel or aluminum. The outer panel is attached to structural members and, along with an inner door panel, defines a space or cavity into which a movable window retracts. In addition to the movable window a number of latch fixtures and window actuators are located in this door space.

Due to the area of the outer panel and its thickness a phenomenon as "oil-canning" may occur. The term oil-canning refers to oil cans of the type in which the bottom of the can flexes back and forth to dispense oil. This movement often creates a popping noise as the metal flexes. As applied to an outer door panel, oil-canning refers to the tendency of the door panel to flex from its desired position (often typically bowed) to a second, undesired position in which the outer panel is deformed or flexed inwardly toward the inner door panel. This movement may occur in response to slight pressures on the outer panel such as the weight of an individual leaning against the vehicle.

Although the oil-canning may be momentary with the panel immediately returning to its original configuration, it may be permanent and, moreover, may cause a crease to form in the panel coating. As will be understood by those in the art creases of this kind must be removed in a bump shop or the like and require that the panel be repainted.

While a number of side impact beams are known, these beams focus on the structural integrity of the motor vehicle in a crash and are not directed to the oil-canning problem. For example, a side impact beam for a vehicle door has been proposed which comprises an open channel-shaped metal member having a longitudinal cavity which is filled with a thermoset or thermoplastic resin-based material core. The core is disposed in the midspan of the beam. The core does not adhere to the sides of the beam. The core may include hollow glass microspheres in order to decrease density and thus weight.

Although filling large volumes of a door cavity could prevent oil-canning, such an approach would also significantly increase mass and thus weight, which, of course is an undesirable feature. In addition, large volumes of foam contribute significantly to cost. Finally, a large foam core often creates an unwanted heat sink. And, although increasing the metal gauge of the door panel or adding localized thick metal reinforcements will increase stiffness, as the metal thickness increases weight increases.

Accordingly, there is a need for a lightweight door panel stiffener which is economical to produce and install. Such stiffener is desirable for door panels in general even when not intended to address the oil canning phenomenon.

SUMMARY OF THE INVENTION

An object of this invention is to provide a reinforcement for a substrate or wall.

A further object of this invention is to provide such a reinforcement which has particular utility where the substrate or wall is a vehicle door panel.

In accordance with this invention a foiled backed laminate reinforcement for a wall or substrate is made from a sheet polymer bonded to a foil support. The polymer is preferably an expandable polymer foam which would be disposed, against the inner surface of the wall or substrate. Upon expansion of the polymer, the polymer foam material is bonded to the inner surface of the substrate.

In one aspect the present invention provides a foil/foam laminate reinforcement which prevents. or substantially reduces oil-canning of outer door panels. The foil/foam laminate has a thin layer of foil bonded to a layer of unexpended expandable resin. The foil/foam laminate is corrugated along its length. The resin side of the laminate is bonded to the inner surface of the outer door panel in approximately the center of the panel. Fixtures may be used to hold the laminate in place. As the motor vehicle moves through a, paint oven the resin expands through activation of a blowing agent and bonds more uniformly to the inner door surface. In one aspect valleys in the contact surface of the resin layer are filled in by the action of the foam expansion. The door panel reinforcement significantly. increases the stiffness of the door panel and eliminates or reduces the tendency of the panel to oil can.

In another aspect the present invention provide a method of reinforcing a door structure to reduce oil-canning. A foil/foam laminate reinforcement is provided which has a thin layer of foil bonded to a layer of unexpanded expandable resin. As stated the foil/foam laminate is corrugated along its length. The laminate is secured to the inner surface of the outer door panel in approximately the center of the panel by placing the resin side in contact with the inner surface of the panel. Fixtures may be used to hold the laminate in place. In one practice of the invention the resin is heated as the motor vehicle oven through a paint oven, which expands the resin through activation of a blowing agent. The expansion serves to bond the laminate more uniformly and securely to the inner door surface. As stated, the door panel reinforcement significantly increases the stiffness of the door panel and eliminates or reduces the tendency of the panel to oil can.

BRIEF DESCRIPTION OF DRAWINGS

FIG. 1 is a side elevational view of the inner surface of a vehicle door panel with an area of reinforcement in accordance with this invention;

FIG. 2 is a cross-sectional view taken through FIG. 1 along the line 2—2;

FIGS. 3–4 are views similar to FIG. 2 of alternative forms of reinforcement in accordance with this invention;

FIG. 5 is a view similar to FIG. 1 of a further practice of this invention;

FIG. 6 is a perspective view showing the foam in the laminate in unexpanded form;

FIG. 7 is a cross-sectional view taken through FIG. 6 along the line 7—7;

FIG. 8 is a cross-sectional view taken through FIG. 5 along the line 8—8 when the laminate is in the form shown in FIGS. 6–7; and FIG. 9 is a view similar to FIG. 8 showing the laminate when the foam is in its expanded state.

DETAILED DESCRIPTION

The present invention is directed to variations of practices described in co-pending application Ser. No. 08/675,173 filed Jul. 3, 1996. The present invention is also directed to variations of my invention described in a co-pending application filed May 7, 1998, entitled "COMPOSITE LAMINATE AUTOMOTIVE STRUCTURES". All of the details of both co-pending applications are incorporated herein by reference thereto. Thus, it will not be necessary to repeat the various possible materials which may be employed in the practice of the invention or the various possible end uses or applications to which the invention may be put where such materials and end uses are referred to in the two co-pending applications.

In general, the invention relates to providing a laminate reinforcement for a structure made of a stiff or generally rigid material. Such structure has an inner surface which may be flat and planar or may have some curvature. A particularly useful application of the invention is as a reinforcement for vehicle door panels. Such vehicle door panels are conventionally made of a metal material such as steel. The invention could be practiced with other stiff or rigid materials including other metals, plastics, etc.

In the general practice of the invention the reinforcing laminate is of two layer construction. An outer or support layer is in the form of a foil backing which could be made of metal, plastic, fiberglass, etc. Preferably, aluminum is used for the foil backing. An expandable foam material is secured to the backing. The foam material is preferably a polymer which is expandable by heat or chemical activation. The foam material may be provided in sheet form disposed against and secured to the foil backing. The foam material is also disposed against the inner surface of the substrate. Upon activation of the foam material the foam material expands and is intimately bonded to the inner surface of the substrate. The foil backed laminate provides a stiffening and strengthening reinforcement that increases the moment of inertia particularly of a flat or shallow curved plate by placing the parent substrate and the high modulus foil away from the neutral axis. The fact that the polymer foam expands and moves the foil away from the substrate assists in stiffening the substrate by increasing the reinforcement section depth. The foil backing acts as a constraining layer to be sure that the polymer is homogeneous throughout the thickness after expansion and cure.

FIGS. 1–2 illustrate one practice of the invention. As shown therein, the invention is used to reinforce a vehicle door 10. As also shown, a two layer laminate 12 is used for the reinforcement. Laminate 12 may be located at a selected portion or portions of the inner surface of door panel or substrate 10 or may reinforce the entire inner surface. Preferably the laminate 12 is located in the central area of the door. Where the substrate is a door panel, sufficient clearance should be provided to accommodate conventional components such as the movable window and its latch fixtures and actuators.

As best shown in FIG. 2 the laminate 12 includes an outer foil backing or support 14 and an intermediate foam polymer 16. Foam polymer 16 is preferably made in sheet form secured to and thus supported by foil backing 14. Foam polymer 16 would be disposed directly against the inner. surface 18 of substrate 10. FIG. 2 illustrates the laminate 12 where the foam is in its unexpanded form. Subsequently, however, the foam polymer would be activated so that it would expand and move the foil backing 14 further away from the parent substrate 10. Where the substrate 10 is an automotive part such as a door panel, the preferred manner of activation is heat activation so that use could be made of various heating steps such as the e-coating that is used in vehicle manufacturing, without requiring any special or additional heating step. It is to be understood, however, that the invention may be practiced with other types of foam material activated in other manners such as chemical activation as is known in the art. Preferably, the sheet polymerisan epoxy of the types described in the aforenoted co-pending applications. The unexpanded epoxy would have a thickness of 0.040–0.200 inches. The foil backing 14 is preferably an aluminum foil 0.001–0.006 inches thick. In this preferred practice of the invention the polymer cures in a paint oven and bonds to the inner surface 18 of the base substrate 10 as well as being bonded to the foil backing. While aluminum is a preferred material for the foil backing, other materials such as other metals, including steel, could be used as well as plastics, fiberglass, etc. Aluminum is a preferred material because it has a high modulus which is particularly advantageous for reinforcement.

An advantage of the invention is that the foil backed laminate can be shaped in sections by suitable known techniques such as by stamping and rolling. The laminate will hold its shape because of the stiffness and light-weightness of the foil backing. The ability to be formed into a particular shape permits the laminate to be used where it is of non-uniform thickness. FIG. 2, for example, illustrates uniform thickness. FIGS. 3–4, however, show variations that could be incorporated which require non-uniform thickness. As shown in FIG. 3 foil backing 14 includes an outer channel section 20 forming a rib or bead in combination with the extended portion 22 of the foam polymer. Similarly, FIG. 4 shows end extensions or flanges 24 for the foil backing an end flanges 26 for the foam polymer in combination with a central extension 28 of the foil backing and a central extension 30 of the polymer. The panel 10 may include a rib 32. The provisions of these outward extensions results in ribbed sections that offer even more panel stiffening than a completely flat or uniform panel and/or laminate because of the increase in section and redistribution of the foil backed laminate reinforcement away from the panel neutral axis. Thus, FIGS. 3–4 illustrate the laminate to include stiffening beads while FIG. 4 additionally includes stiffening edge flanges.

FIG. 2 illustrates the door panel 10 to have a shallow curved configuration, while FIGS. 3–4 show the panel 10 to be flat.

FIGS. 5–9 illustrate a variation of the invention wherein the laminate 36 is structured to address the oil canning phenomenon. As shown therein, the foil backing 38 and polymer foam 40 would be of generally the same thicknesses as with the prior embodiments. A difference of laminate 36, however, is that it is formed in corrugated or undulating shape having alternating hills and valleys. The laminate 36 could be mounted to the door panel or substrate 10 in the manner illustrated in FIGS. 2–4 where it is simply disposed against the desired portion of the inner surface 18 of the substrate 10. The characteristics of the foam material are sufficient to initially mount the laminate in place. The mounting becomes permanent upon curing of the polymer when it expands and becomes intimately bonded to the inner surface 18 of the panel 10. If desired, however, the various practices of the invention (including FIGS. 2–4) may incorporate a fixture such as U-shaped frame 42 which would be secured to inner surface 18 of substrate 10. The laminate 36 could then be placed in the fixture as shown in FIG. 8. Initial contact of polymer 40 against panel 10 temporarily holds laminate 36 in place. Upon expansion of the foam material 40 the foam would become intimately bonded to the inner surface 18 while the foil backing 38 would be moved outwardly from inner surface 18 as illustrated in FIG. 9.

As shown in FIG. 9, after activation or expansion of the foam 40 the valleys on the side of the foam 40 disposed toward inner surface 18 become filled by the foam expansion. The corrugated foil backing 38, however, retains its shape and correspondingly the outer surface of the foam 40 is likewise corrugated. Preferably, the laminate 36 would be located at approximately the center of the substrate 10 when used as a door panel. The significant increase in the stiffness of the door panel eliminates or reduces the tendency of the panel to exhibit the oil canning phenomenon.

What is claimed is:

1. A reinforced wall comprising a stiff substrate having an inner surface, a reinforcing laminate bonded to said inner surface, said reinforcing laminate comprising an outer support made of a foil material, an expandable polymer foam material bonded to said foil support and disposed against said inner surface of said substrate, said foam material being bondable to said inner surface upon expansion of said foam material, said laminate having outer edges, said laminate including a stiffening bead formed by said foil support and said foam material located generally centrally of said outer edges, said expandable polymer foam material being a material which upon expansion moves said foil material laterally away from said inner surface with said foil material spaced away from said inner surface, and said expandable foam material before expansion being bonded to and held by said foil material whereby said foil material and said foam material forms a coupled unit before and after expansion.

2. The reinforced wall of claim 1 wherein said substrate and said inner surface are flat and planar.

3. The reinforced wall of claim 1 wherein said substrate and inner surface are of shallow curved configuration.

4. The reinforced wall claim 1 wherein said polymer foam is heat expandable.

5. The reinforced wall of claim 1 wherein said foil material is metal.

6. The reinforced wall of claim 1 wherein said substrate is a vehicle part.

7. The reinforced wall of claim 1 wherein said substrate is a vehicle door panel.

8. The reinforced wall of claim 7 wherein said foam material has a thickness before expansion of 0.040–0.200 inches.

9. The reinforced wall of claim 8 wherein said foil support has a thickness of 0.001–0.006 inches.

10. The reinforced wall of claim 9 wherein said foil support is made of aluminum.

11. The reinforced wall of claim 1 wherein each of said outer edges terminates in an outwardly extending edge flange disposed perpendicular to and away from said substrate.

12. The reinforced wall of claim 1 wherein said stiffening bead is generally located centrally between said outer edges to cause an outward bulge in said laminate centrally between said outer edges.

13. The reinforced wall of claim 12 wherein each of said outer edges terminates in an outwardly extending edge flange disposed perpendicular to and away from said substrate.

14. The reinforced wall of claim 12 wherein said substrate is a vehicle door panel.

15. The reinforced wall of claim 1 wherein said substrate is a vehicle door panel, a fixture mounted to said door panel, and said fixture being in the form of an open sided pocket having an open upper end into which said laminate is placed to be disposed against said vehicle door panel, and wherein said vehicle door panel forms one wall of said fixture.

16. The reinforced wall of claim 1 wherein said foil material does not extend peripherally beyond the peripheral edges of said foam material upon expansion of said foam material.

17. The reinforced wall of claim 1 wherein said foil support has a thickness of 0.001–0.006 inches.

18. A reinforced wall comprising a stiff substrate having an inner surface, a reinforcing laminate bonded to said inner surface, said reinforcing laminate comprising an outer support made of a foil material, an expandable polymer foam material bonded to said foil support and disposed against said inner surface of said substrate, said foam material being bondable to said inner surface upon expansion of said foam material, both of said foil support and said foam material of said laminate being of corrugated shape to cause said laminate as a whole to be of corrugated shape along opposite outer surfaces of said laminate, said expandable polymer foam material being a material which upon expansion moves said foil material laterally away from said inner surface with said foil material spaced away from said inner surface, and said expandable foam material before expansion being bonded to and held by said foil material whereby said foil material and said foam material forms a coupled unit before and after expansion.

19. The reinforced wall loaf claim 18 wherein said substrate is a vehicle door panel.

20. The reinforced wall of claim 18 wherein said polymer foam is heat expandable, and said foil material being metal.

21. The reinforced wall of claim 20 wherein said foam has a thickness-before expansion of 0.040–0.200 inches, and said foil has a thickness of 0.001–0.006 inches.

22. The reinforced wall of claim 18 wherein said foil material does not extend peripherally beyond the peripheral edges of said foam material upon expansion of said foam material.

23. The reinforced wall of claim 18 wherein said foil support has a thickness of 0.001–0.006 inches.

24. A reinforced wall comprising a stiff substrate having an inner surface, a reinforcing laminate bonded to said inner surface, said reinforcing laminate comprising an outer support made of a foil material, an expandable polymer foam material bonded to said foil support and disposed against said inner surface of said substrate, said foam material being bondable to said inner surface upon expansion of said foam material, said expandable polymer foam material being a material which upon expansion moves said foil material laterally away from said inner surface with said foil material spaced away from said inner surface, and said expandable foam material before expansion being bonded to and held by said foil material whereby said foil material and said foam material forms a coupled unit before and after expansion, including a fixture mounted to said inner surface of said substrate, said laminate being disposed in said fixture, one wall of said fixture being said inner surface of said substrate, said laminate before expansion being of substantially smaller volume than said fixture, said laminate substantially filling, said fixture after expansion with said foam material bonded to said inner surface of said substrate.

25. The reinforced wall of claim 24 wherein said substrate is a vehicle door panel, and said fixture being in the form of an open sided pocket having an open upper end into which said laminate is placed to be disposed against said vehicle door panel.

26. The reinforced wall of claim 24 wherein said polymer foam is heat expandable, and said foil material being metal.

27. The reinforced wall of claim 26 wherein said foam has a thickness before expansion of 0.040–0.200 inches, and said foil has a thickness of 0.001–0.006 inches.

28. The reinforced wall of claim 24 wherein said foil material does not extend peripherally beyond the peripheral edges of said foam material upon expansion of said foam material.

29. The reinforced wall of claim 24 wherein said foil support has a thickness of 0.001–0.006 inches.

* * * * *

UNITED STATES PATENT AND TRADEMARK OFFICE
CERTIFICATE OF CORRECTION

PATENT NO.    : 6,482,496 B1                                           Page 1 of 1
DATED         : November 19, 2002
INVENTOR(S)   : Wycech It is certified that error appears in the above-identified patent and that said Letters Patent is hereby corrected as shown below:

Column 6,
Line 45, delete "loaf", and insert therefor -- of --.
Line 50, after "thickness", delete "-".

Column 7,
Line 11, after "filling", delete ",".

Signed and Sealed this

Twenty-second Day of July, 2003

JAMES E. ROGAN
*Director of the United States Patent and Trademark Office*